United States Patent
Boddakayala et al.

(10) Patent No.: US 12,506,195 B2
(45) Date of Patent: Dec. 23, 2025

(54) LIQUID CURABLE THERMAL BARRIER COMPOSITIONS FOR ELECTROCHEMICAL CELLS

(71) Applicant: FORD GLOBAL TECHNOLOGIES, LLC, Dearborn, MI (US)

(72) Inventors: Bhaskara Rao Boddakayala, Troy, MI (US); Patrick Daniel Maguire, Ann Arbor, MI (US); Brian Utley, Canton, MI (US); Thomas Edward Smith, Livonia, MI (US); Mohammadreza Eftekhari, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1012 days.

(21) Appl. No.: 17/502,849

(22) Filed: Oct. 15, 2021

(65) Prior Publication Data
US 2023/0124482 A1 Apr. 20, 2023

(51) Int. Cl.
*H01M 10/658* (2014.01)
*H01M 10/653* (2014.01)

(52) U.S. Cl.
CPC ....... *H01M 10/658* (2015.04); *H01M 10/653* (2015.04)

(58) Field of Classification Search
None
See application file for complete search history.

(56) References Cited

U.S. PATENT DOCUMENTS

| | | | |
|---|---|---|---|
| 8,541,126 B2 | 9/2013 | Hermann et al. | |
| 8,999,553 B2 | 4/2015 | Anandan et al. | |
| 10,501,597 B2 | 12/2019 | O'Neil et al. | |
| 10,829,609 B2 | 11/2020 | O'Neil et al. | |
| 2007/0238008 A1* | 10/2007 | Hogan | H01M 10/613 429/433 |

FOREIGN PATENT DOCUMENTS

| | | |
|---|---|---|
| AU | 2004247667 A1 | 12/2004 |
| CN | 109004109 A | 12/2018 |
| JP | 5285662 B2 | 2/2011 |

* cited by examiner

*Primary Examiner* — Wyatt P McConnell
(74) *Attorney, Agent, or Firm* — David B Kelley; Brooks Kushman P.C.

(57) ABSTRACT

An electrochemical system having a thermal barrier layer is provided. The thermal barrier layer includes a polymer network having an inorganic portion and an organic portion such as silicone or a polysiloxane polymer network. The polymer network may further include filler component dispersed therein such as oxidized polyacrylonitrile milled fiber, Aerogel, hollow glass microspheres, and mica.

20 Claims, 2 Drawing Sheets

LIQUID CURABLE THERMAL BARRIER COMPOSITIONS FOR ELECTROCHEMICAL CELLS

TECHNICAL FIELD

The present disclosure relates to thermal barriers and thermal barrier compositions for electrochemical cells and more particularly for high voltage batteries.

BACKGROUND

Advances to reduce dependence on fossil fuels and to use other energy sources are underway. However, many of these efforts require or rely on the storage of the energy. Electrochemical cells such as batteries are a primary method of storing such energy. For example, electric vehicles (EVs) may have high voltage batteries. However, batteries and high voltage batteries may include chemical components. Further, overcharge events may lead to excessive temperatures that generate gases. Even further, excessive temperatures in one cell may be transferred to neighboring cells. Heat transfer mechanisms designed to reduce overheating such a cooling plates may also undesirably assist in transferring heat from one cell array or module to another. This can disrupt the electrochemical components or the system.

SUMMARY

An electrochemical system including a housing, an electrochemical cell, and a thermal barrier layer is provided. The electrochemical cell may be disposed within the housing and include positive and negative electrodes in contact with an electrolyte. The thermal barrier layer is adjacent to the electrochemical cell and includes a polymer network having an inorganic portion and an organic portion with milled fiber, Aerogel, hollow microspheres, and a mineral filler dispersed therein. The thermal barrier layer may have a thermal stability of at least 600° C. and a thermal conductivity of no more than 0.3 $W \cdot m^{-1} \cdot K^{-1}$.

A thermal barrier composition including a curable silicon dioxide, silicone resin and/or polysiloxane monomer, oligomer, and/or pre-polymer, an activator and/or catalyst, a milled fiber, Aerogel, hollow microspheres, and a mineral filler is provided. Upon activation the thermal barrier composition forms a thermal barrier layer having a thermal stability of at least 600° C. and a thermal conductivity of no more than 0.3 $W \cdot m^{-1} \cdot K^{-1}$.

A method of forming a thermally insulated electrochemical system is provided. The method includes arranging an electrochemical cell in a housing, dispensing a thermal barrier composition within the housing such that it is adjacent to the electrochemical cell, and curing the thermal barrier composition to form a thermal barrier layer. The thermal barrier layer has a thermal conductivity of no more than 0.3 $W \cdot m^{-1} \cdot K^{-1}$.

DETAILED DESCRIPTION

Figure 1:
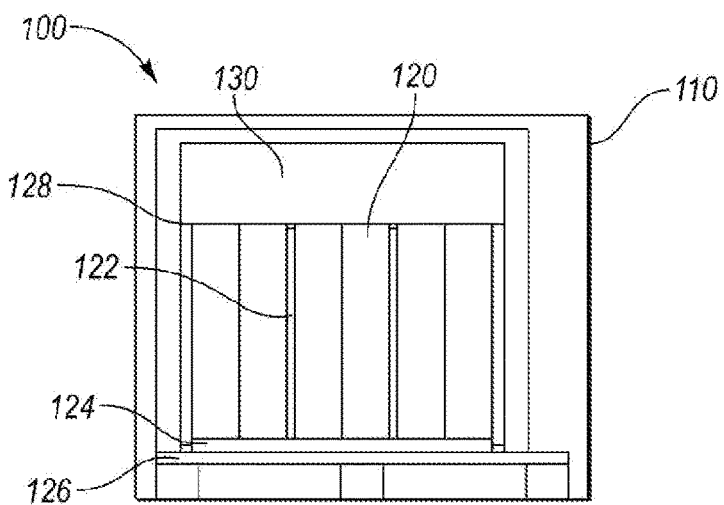
FIG. 1 is an electrochemical cell including a thermal barrier.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, all R groups (e.g., $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'', and R''' are $C_{1-10}$ alkyl or $C_{6-18}$ aryl groups, $M^+$ is a metal ion, and $L^-$ is a negatively charged counter ion; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, $-NO_2$, $-NH_2$, $-N(R'R'')$, $-N(R'R''R''')^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3^-M^+$, $-PO_3^-M^+$, $-COO^-M^+$, $-CF_2H$, $-CF_2R'$, $-CFH_2$, and $-CFR'R''$ where R', R'', and R''' are $C_{1-10}$ alkyl or $C_{6-18}$ aryl groups, $M^+$ is a metal ion, and $L^-$ is a negatively charged counter ion; when a given chemical structure includes a substituent on a chemical moiety (e.g., on an aryl, alkyl, etc.) that substituent is imputed to a more general chemical structure encompassing the given structure; percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within +0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Figure 2:
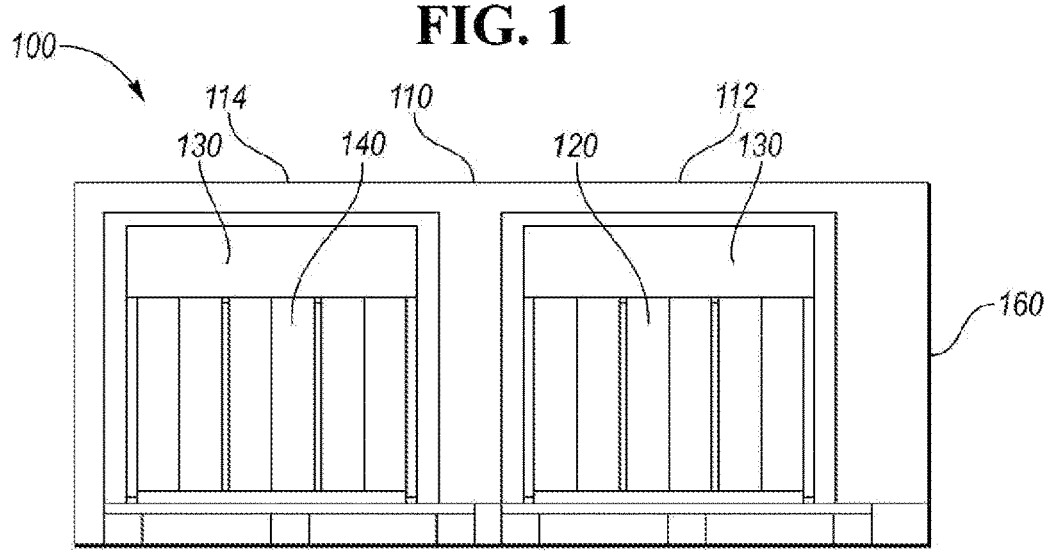
FIG. 2 is an electrochemical system including a thermal barrier and foam.

An electrochemical system such as a high voltage battery having a thermal barrier is provided. In FIG. 1, electrochemical system 100 includes a housing 110 with a first electrochemical cell or module 120 and a first thermal barrier layer 130 therein. The electrochemical system 100, as shown in FIG. 2, may include a second electrochemical cell or module 140. The first thermal barrier layer 130 may be adjacent to or surround the first electrochemical cell or module 120 and a second thermal barrier layer 150 may be adjacent to or surround the second electrochemical cell or module 140. In a variation, the first and second thermal barrier layers may be an integral portion or a single thermal barrier layer surrounding and separating the electrochemical cells and/or modules. The thermal barrier layer may be immediately adjacent to the first and/or second electrochemical cell. A foam 160 such as an epoxy or polyurethane foam may be adjacent to, between, or at least partially surrounding the first and/or second thermal barrier layers. The electrochemical cells may each include a positive and a negative electrode in contact with an electrolyte. The thermal barrier layer includes a silicone or polysiloxane polymer network having filler materials such as fiber, Aerogel, hollow spheres, and/or mica powder.

The housing 110 is not particularly limited and may be any suitable shape and size. The cell may have a prismatic or pouch structure or housing. The disclosure may be particularly relevant to electrochemical systems using pouch cells which generally have less structural support and protection. Further, pouch cell systems generally have less controlled venting system. The housing 110 may be vented or may form a hermetic seal isolating the interior from the exterior. The housing 110 may be configured to house one or more electrochemical cells. The housing 110 should be made of a material stable at operating temperatures (i.e., 25° C., 40° C. or 80° C.). In a refinement and as shown in FIG. 2, the housing 110 may have a first portion 112 housing a first electrochemical cell and/or first group of electrochemical cells (i.e., an array, module or pack) and a second portion 114 housing second electrochemical cell and/or second group or electrochemical cells. In a refinement, the housing 110 may be formed of polymeric materials and/or metallic material such as aluminum.

The electrochemical cell 120 includes a positive and a negative electrode in contact with an electrolyte. The electrodes may be made of any suitable materials such as but not limited to carbon and/or aluminum. The electrochemical cell 120 may further include a current collector, and a separator between the positive and negative electrodes. The electrochemical cell 120 may also include a compression foam and/or thermal barrier sheet 122, a thermal interface material 124, a cooling plate 126 such as a liquid cooled cold plate, and an end plate 128. The electrochemical cell 120 may be a fuel cell or battery cell. The electrochemical system 100 may include a plurality of electrochemical cells which when packaged together or within a frame may be referred to as an array or module (e.g., 6-12 cells). A number of modules may be packaged or framed together to form a pack (e.g., 6-12 modules). The electrochemical cells may form, for example, a primary or secondary battery. The electrochemical cell may operate at higher voltages than conventional electrochemical cells. For example, the electrochemical cell may have a voltage of greater than 4.2 V when fully charged or a nominal voltage of greater than 3.7 V.

The thermal barrier layer 130 may be positioned adjacent to any portion of an electrochemical cell, array, module, and/or pack. For example, the thermal barrier layer 130 may be between electrochemical cells, arrays, modules and/or packs. The thermal barrier layer 130 may also surround individual cells, arrays, modules, and/or packs. The thermal barrier layer 130 may also be disposed in any available space between the electrochemical cell(s), array(s), module(s), and/or pack(s) and the housing 110. The thermal barrier layer may have a thermal conductivity of no more than 0.3 $W \cdot m^{-1} \cdot K^{-1}$, or more preferably no more than 0.2 $W \cdot m^{-1} \cdot K^{-1}$, or even more preferably no more than 0.1 $W \cdot m^{-1} \cdot K^{-1}$, or still more preferably no more than 0.05 $W \cdot m^{-1} \cdot K^{-1}$. In a refinement, the thermal barrier layer 130 may have a thermal conductivity of 0.01 to 0.3 $W \cdot m^{-1} \cdot K^{-1}$, or more preferably 0.02 to 0.2 $W \cdot m^{-1} \cdot K^{-1}$, or even more preferably 0.05 to 0.1 $W \cdot m^{-1} \cdot K^{-1}$. The thermal barrier layer 130 may also be configured such that it does not interfere with the electrochemical cells, such as having a dielectric constant of at least 2, or more preferably at least 3, or even more preferably at least 4. In a variation, the thermal barrier layer 130 may have a dielectric constant of 1.5 to 7, more preferably 2 to 6 or even more preferably 3 to 5. In a refinement, the thermal barrier layer 130 has an electrical insulation of greater than 1,750 or more preferably 2,000, or even more preferably 2500 V/mm. The thermal barrier layer 130 may have a flexibility and/or elasticity to withstand the operation expansion and contraction of the electrochemical cell 120. The thermal barrier layer 130 may also have a shore A hardness of no more than 40, or more preferably no more than 30 or even more preferably no more than 25.

The thermal barrier layer 130 may include an organosilicon polymer network having an inorganic polymer portion (e.g., Si—O—Si linkages) such as silicone or polysiloxane and an organic polymer portion (e.g., methyl groups). Silicone or polysiloxane polymers, for example, may have inorganic silicon-oxygen backbones with organic pendent groups bonded to the silicon portions. Alternatively, an organic portion may intermittently make up portions of the polymer backbone of silicon-oxygen linkages. Linear, branched, or crosslinked polymer networks may be used.

For example, silicon oxygen crosslink or various organic crosslinks may be used for crosslinking.

In one variation, the polymer network may include a structure corresponding to formula I:

$$(-R_1R_2Si-O-SiR_3R_4-)_n \quad (I)$$

where each radical group/R-group (i.e., $R_{1-4}$) may be organic portions such as but not limited to alkyl, aryl, heteroaryl, hydroxyl, carboxylate, carbamate, amino, halides, or combinations thereof and n may be 10 to 500,000, more preferably 100 to 300,000, or even more preferably 10,000 to 150,000. The alkyl groups may have 1 to 20 carbons, more preferably 1 to 10 carbons, or even more preferably 1 to 5 carbons. For example, R-groups may be methyl groups. Smaller R-groups and/or organic portions will provide improved heat tolerance. For example, R-groups may have a molecular weight of less than 500 g/mol, or more preferably less than 150 g/mol, or even more preferably less than 75 g/mol. The thermal barrier layer 130 may also include, in combination or alternatively, a structure corresponding to formula II and/or formula III:

$$(-R_1Si-O-SiR_2-)_n \quad (II)$$

$$(-R_1R_2Si-O-R_3-)_n \quad (III)$$

The silicone or polysiloxane polymer may provide for low thermal conductivity such as no more than 0.5 $W \cdot m^{-1} \cdot K^{-1}$, or more preferably no more than 0.3 $W \cdot m^{-1} \cdot K^{-1}$, or even more preferably no more than 0.1 $W \cdot m^{-1} \cdot K^{-1}$. Silicone or polysiloxane polymers may also have low reactivity and provide high thermal stability of, for example, at least 600° C., or more preferably 800° C., or even more preferably 1000° C. Thermal stability may be understood as a weight loss of less than 30% as measured by thermal gravimetric analysis (TGA) when heating from 40° C. to 750° C. under nitrogen (80 mL/min) and from 750 to 900° C. under ambient air (80 ml/min) at a rate of 30 K/minute. Traditional silicone or polysiloxane polymers may degrade at much lower temperatures such as, for example, 400° C. The amount and composition of the organic portions may play a significant role in the thermal stability of the polymer. For example, polymers with reduced organic content will generally have higher thermal stability. For example, the mass ratio of siloxane (i.e., Si—O—Si) to organic content may be 1:0.1 to 1:25, or more preferably 1:0.5 to 1:10, or even more preferably 1:0.7 to 1:6. In a refinement, the inorganic portion may be 60%, or more preferably 70%, or even more preferably 80% by weight of the polymer network with the remaining portion being the organic portion. A siloxane-based thermal barrier layer 130 may be particularly suitable because of its elastic properties such as sufficient flexibility and thermal expansion. For example, Novagard Thermal Management Materials under the name NovaTherm such as 600-303, 600-305, 600-307, 600-310, and/or 600-315 from NovaGard may be used. The silicone resin and/or polysiloxane polymer network may be 40 to 98%, or more preferably 60-95%, or even more preferably 70-90% by weight of the thermal barrier layer 130.

The thermal barrier layer 130 also includes filler such as fibers, Aerogel, hollow spheres, and/or mineral fillers. The filler is dispersed and fixed within the polysiloxhane or silicone polymer network. Filler may be present in an amount of 1 to 30%, or more preferably 5 to 15%, or even more preferably 7 to 13% by weight of the thermal barrier layer 130.

The fiber may be milled fiber such as polyacrylonitrile (PAN), oxidized polyacrylonitrile, nonwoven ceramic fibers, nonwoven glass fibers, or combinations thereof and may have a length of greater than 50 μm, more preferably greater than 100 μm, or even more preferably greater than 200 μm. For example, the fibers may have a length of 10 to 500 μm, or more preferably 25 to 400 μm, or even more preferably 50 to 350 μm. For example, AGM62MF0400 from Ashbury Graphite Mill, Inc. may be used. Fiber or milled fiber may be present in an amount of 1 to 25%, more preferably 2 to 13%, or even more preferably 5 to 8% by weight of the thermal barrier layer 130.

Aerogel may be provided as a powder and contribute to thermal insulation and stability. Aerogel further reduces the density and/or weight of the thermal barrier layer 130. Aerogel is a porous material made from a gel where the gel structure is maintained while the liquid component is removed. Aerogel may be silica, carbon, metal oxide, or polymer based. Silica-based Aerogel may be preferable because of its thermal properties such as improved thermal stability and insulation. The Aerogel may have a thermal conductivity of no more than 0.2 $W \cdot m^{-1} \cdot K^{-1}$, more preferably no more than 0.1 $W \cdot m^{-1} \cdot K^{-1}$, or even more preferably no more than 0.05 $W \cdot m^{-1} \cdot K^{-1}$. Aerogel may be provided as a powder. For example, P100, P200 and/or P300 from Cabot® Aerogel GmbH with a Business & Technology Center in Billerica, Massachusetts may be used. Aerogel may be present in an amount of 0.1 to 5%, or even preferably 0.2 to 3%, or even more preferably 0.5 to 1.5% by weight of thermal barrier layer 130.

Hollow microspheres such as polymeric beads or glass bubbles may be included. Glass bubbles may be preferable for their thermal properties and stability. The hollow microspheres may have a max-Feret-diameter of 1 to 1000 μm, or more preferably 5 to 600 μm, or even more preferably 10 to 300 μm. For example, 3M™ K and S series glass bubbles may be used. Hollow microspheres may be present in an amount of 0.1 to 5%, or more preferably 0.25 to 3%, or even more preferably 0.5 to 1.5% by weight of the thermal barrier layer 130. Although referred to as microspheres, the hollow microspheres are not particularly limited to sphere-shaped particles but may be any hollow particle of various shapes. For example, the hollow microspheres may be ellipse-shaped.

Mineral fillers such as mica or Kaolin may be present in an amount of 0.1% to 10%, or more preferably 1 to 5%, or even more preferably 1.5 to 2.5% by weight of the thermal barrier layer 130. Although, mica may be preferable for its superior thermal properties. The thermal barrier composition including the ingredients and quantities discussed herein may provide for a homogeneous thermal barrier composition 130.

A foam 160 such as epoxy or polyurethane foam may be adjacent to, between, or surrounding the first and/or second thermal barrier layers. The foam may be formed from two components that chemically react to produce a polymer network or introduced to an activator or initiator. The foam may include fire-retardant additives. In a variation, the foam does not self-ignite or has thermal stability such that the foam does not ignite or lose more than 30% of its weight when exposed to 700° C. for 5 minutes, or more preferably 10 minutes, or even more preferably 15 minutes. In a refinement, the foam may also be self-extinguishing, such as within 30 seconds, or more preferably 20 seconds, or even more preferably 10 seconds. For example, the foam may satisfy UL94 V-2, or more preferably V-1, or even more preferably V-0. The foam may also carbonize instead of burning when exposed to excessive temperature such as temperature of 800° C. or more, or more preferably 900° C.

or more, or even more preferably 1000° C. or more for at least 5 minutes, or more preferably at least 10 minutes, or even more preferably at least 15 minutes. One or more blowing agents may also be used to produce a foam or for cell formation. The foam 160 may preferably be an open cell foam to allow gas venting. The foam may also be expandable such that it has an expansion of 200 to 1200%, or more preferably 350 to 1000%, or even more preferably 500 to 800%. In a refinement, the expansion may be at least 300%, or preferably at least 500%, or even more preferably at least 700%. Expansion may be defined as a change in volume as defined below.

$$\text{Expansion} = \frac{v_f}{v_0} \times 100 \qquad \text{(I)}$$

Where $V_0$ is the initial volume and $V_f$ is the final volume. For example, the expansion may be determined by adding 10 mL of a composition in a graduated cylinder, initiating expansion and measuring the final volume. The combination of an expanded self-extinguishing foam 160 and the thermal barrier layer 130 may provide benefits not witnessed by either material alone. For example, the self-extinguishing foam 160 acts to extinguish while the thermal barrier layer 130 protects the electrochemical cell(s) from excessive heat. In yet another example, the use of merely an expandable self-extinguishing foam may be difficult because, during expansion, the electrochemical cell 120 may be dislodged. However, this may not occur or is less likely upon adding and curing the thermal barrier composition to form a thermal barrier layer 130 which acts to the protect the electrochemical cell 120 from pressures or forces associated with the expansion.

Figure 3:
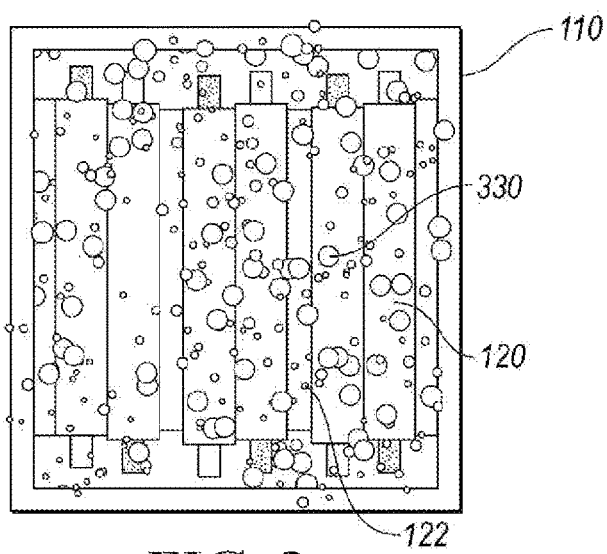
FIG. 3 is an electrochemical system containing a liquid composition for forming a thermal barrier.
Figure 4:
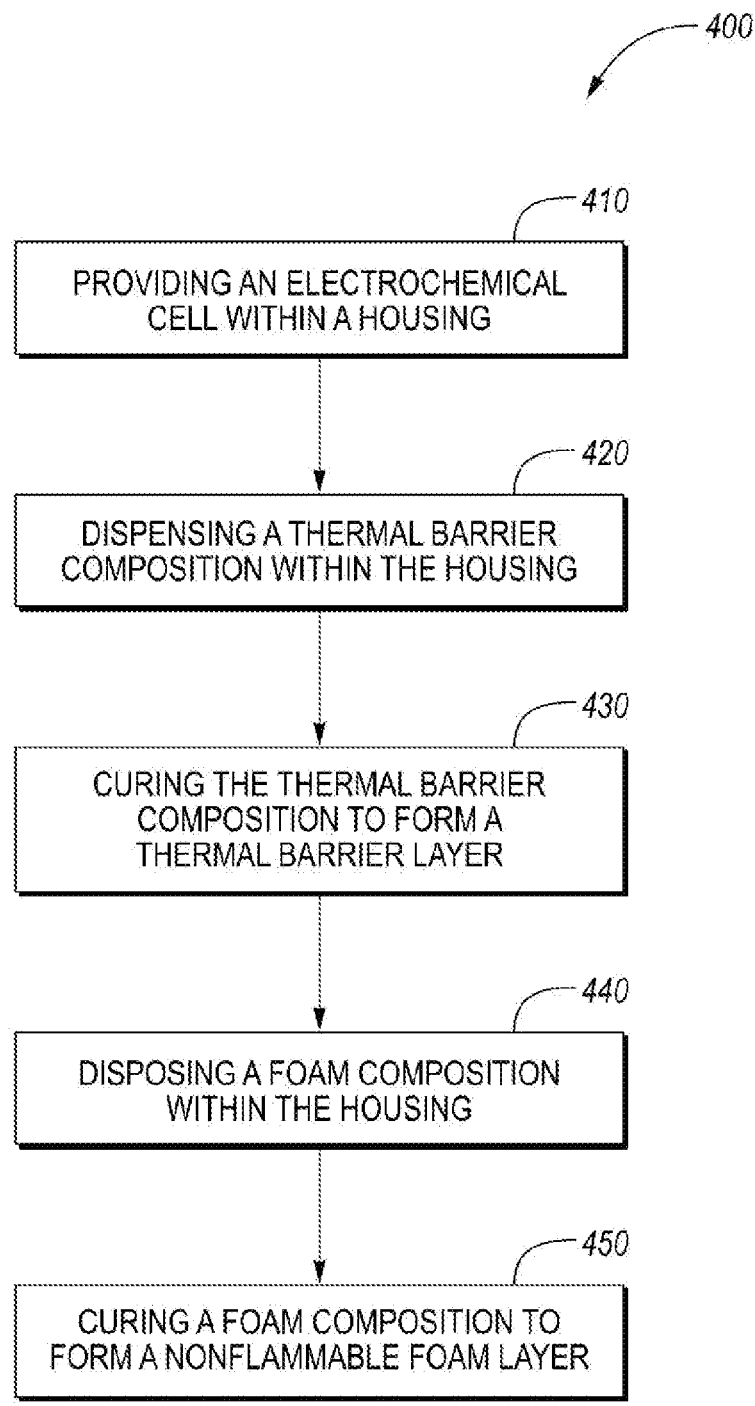
FIG. 4 is a method of providing an electrochemical system with a thermal barrier.

A method of making an electrochemical system 400 having the thermal barrier layer 130 adjacent to or surrounding the first electrochemical cell 120 and having the foam 160 surrounding the thermal barrier layer is provided as shown in FIG. 4. The method 400 includes step 410 arranging an electrochemical cell in the housing 110. The housing is capable of holding a volume of liquid or a flowable material in addition to housing the electrochemical cell as shown, for example, in FIG. 3. The method 400 includes step 420 dispensing a flowable thermal barrier composition 330 in the housing such that it is adjacent to or surrounds the first electrochemical cell 120. The flowable thermal barrier composition 330 may be dispensed by, for example, pouring or injecting it into the housing 110. The flowable thermal barrier composition 330 should be introduced into the housing 110 in such a way as to not disrupt or disengage the electrochemical cell(s) 120 or components thereof. In a variation, the thermal barrier composition 330, has an expansion of less than 10%, or more preferably less than 1%, or even more preferably no expansion. In a refinement, the composition may be evenly dispensed such as by evenly pouring it such that it does not cause uneven or unbalanced stresses on the electrochemical cell(s) 120 or components thereof. The thermal barrier composition 330 should be dispensed in the housing such that it doesn't move or dislodge any component of the electrochemical cell 120. For example, no components should move more than 0.5 mm, or more preferably no more than 0.1 mm or more preferably no more than 0.01 mm as a result of the thermal barrier composition 330 being dispensed in the housing 110. The thermal barrier composition may have a viscosity of 1,000 to 12,000 cps, or more preferably 2,500 to 10,000 cps, or even more preferably 5,000 to 8,000 cps at 25° C. and 0.1 to 10 s$^{-1}$ (e.g., 4.18 s$^{-1}$). Once disposed in the housing 110 the thermal barrier composition 330 is cured (i.e., step 430) and upon curing the thermal barrier layer 130 is formed adjacent to or surrounding the first electrochemical cell 120. Curing may occur by heating, introduction of an activator or initiator, or via mixing two components. For the latter two, polymerization may occur at room temperature. As described further below, a catalyst may be used to facilitate curing. The housing 110 may also house the second electrochemical cell 140 and the thermal barrier composition may be dispensed such that it is adjacent to or surrounds the second electrochemical cell 140 as well as the first electrochemical cell 130. The thermal barrier layer 130 may act as a thermal barrier between the first and second electrochemical cells thermally insulating them from one another. After curing the flowable thermal barrier composition 330 to form a thermal barrier layer 130, a foam composition may be disposed in the housing and may be adjacent to or surrounding the first and/or second electrochemical cells 130, 140 with the thermal barrier layer 130 disposed therebetween (i.e., step 440). The foam composition may then be cured to form the foam 160 (i.e., step 450) such as an epoxy foam.

The thermal barrier composition 330 may include a flowable and/or liquid silicone resin, polysiloxane, siloxane, silane monomer, oligomer, pre-polymer, silicon dioxide, or combination thereof. High molecular weight silicone resins or polysiloxane such as 500 to 25,000, or more preferably 1,000 to 15,000 or even more preferably 2,000 to 10,000 g/mol may be more preferable to prevent negative impacts on electrical components. For example, smaller siloxanes may be more reactive and produce deposits on electric components that interfere with their efficiency or effectiveness. The thermal barrier composition 330 may also include an activator/catalyst and/or filler such that when it is cured the filler is dispersed within a silicone or polysiloxane polymer network forming a thermal barrier layer. The catalyst and/or activator may be, for example, a platinum catalyst. A catalyst may accelerate polymerization or reduce the temperature necessary for such reaction. Heat may also be used to activate or initiate polymerization, although room temperature (e.g., 25° C.) or low temperatures may be more suitable as they are less likely to disrupt the electrochemical cells or components thereof already present in the housing. Polymerization at room temperature or low temperatures may occur with or without the use of a catalyst. The composition may be configured to have a pot life of 1 minute to 1 hour, more preferably 2 to 30 minutes, or even more preferably 3 to 10 minutes. The composition 330 may also cure within 20 minutes to 20 hours, more preferably 30 minutes to 15 hours, or even more preferably 40 minutes to 10 hours. The catalyst and/or activator may be present in an amount of 0.1 to 15%, or more preferably 4 to 12%, or even more preferably 6 to 10% by weight of the thermal barrier composition 330. In some embodiments, a catalyst and/or activator may not be present.

Table 1 demonstrates an exemplary thermal barrier composition that may be cured into a thermal barrier layer.

| Component | Weight (g) | Weight (%) |
|---|---|---|
| Silicone Base | 2135.1 | 81.52% |
| Silicone Curing Agent/Activator | 213.5 | 8.15% |
| Milled Fibers | 171.3 | 6.54% |

-continued

| Component | Weight (g) | Weight (%) |
|---|---|---|
| Aerogel | 28 | 1.07% |
| Glass bubbles | 22 | 0.84% |
| Mica | 49.3 | 1.88% |
| TOTAL | 2619.2 | 100.00% |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrochemical system comprising:
a housing;
a first electrochemical cell in the housing and having an electrolyte, a negative electrode in contact with the electrolyte, and a positive electrode in contact with the electrolyte; and
a thermal barrier layer adjacent to the first electrochemical cell and including a polymer network having an inorganic polymer portion and an organic polymer portion with fiber, Aerogel, hollow microspheres, and a mineral filler dispersed therein, wherein the thermal barrier layer has a weight loss of less than 30% by a thermal gravimetric analysis when heated from 40° C. to 900° C. at a rate of 30 K/minute.

2. The electrochemical system of claim 1, wherein the thermal barrier layer includes a silicone and/or polysiloxane polymer network.

3. The electrochemical system of claim 1, wherein the fiber is oxidized polyacrylonitrile.

4. The electrochemical system of claim 1, wherein the Aerogel is silica-based.

5. The electrochemical system of claim 1, wherein the hollow microspheres are glass bubbles.

6. The electrochemical system of claim 1, wherein the mineral filler is mica.

7. The electrochemical system of claim 1, wherein the thermal barrier layer is disposed between the first electrochemical cell and a second electrochemical cell.

8. The electrochemical system of claim 1, wherein an epoxy foam is disposed adjacent to the first electrochemical cell with the thermal barrier layer disposed therebetween.

9. The electrochemical system of claim 1, wherein the Aerogel is present in an amount of 0.2 to 3% by weight of the thermal barrier layer.

10. The electrochemical system of claim 1, wherein the hollow microspheres are present in an amount of 0.25 to 3% by weight of the thermal barrier layer.

11. The electrochemical system of claim 1, wherein the Aerogel is present in an amount of 0.5 to 1.5% by weight of the thermal barrier layer and the hollow microspheres are present in an amount of 0.5 to 1.5% by weight of the thermal barrier layer.

12. The electrochemical system of claim 11, wherein the Aerogel is silica-based.

13. The electrochemical system of claim 1, wherein the inorganic polymer portion is present in an amount of 70 to 90% of the polymer network.

14. The electrochemical system of claim 13, wherein the inorganic polymer portion is derived from a silicone resin and/or polysiloxane.

15. The electrochemical system of claim 1, wherein the fiber is present in an amount of 1 to 25% by weight of the thermal barrier layer.

16. The electrochemical system of claim 1, wherein the fiber is present in an amount of 7 to 13% by weight of the thermal barrier layer.

17. The electrochemical system of claim 1, wherein the mineral filler is present at 0.1 to 10% by weight of the thermal barrier layer.

18. The electrochemical system of claim 1, wherein the thermal the Aerogel is present in an amount of 0.1 to 5% by weight of the thermal barrier layer, the hollow microspheres are present in an amount of 0.1 to 5% by weight of the thermal barrier layer, and the barrier layer has a thermal conductivity of no more than 0.05 W·m$^{-1}$·K$^{-1}$.

19. An electrochemical system comprising:
a housing;
a first electrochemical cell in the housing and having an electrolyte, a negative electrode in contact with the electrolyte, and a positive electrode in contact with the electrolyte; and
a thermal barrier layer adjacent to the first electrochemical cell and including a polymer network having an inorganic polymer portion and an organic polymer portion with an oxidized polyacrylonitrile fiber present in an amount of 1 to 25% by weight of the thermal barrier layer, Aerogel present in an amount of 0.1 to 5% by weight of the thermal barrier layer, glass bubbles present in an amount of 0.1 to 5% by weight of the thermal barrier layer, and mica present at 0.1 to 10% by weight of the thermal barrier layer each dispersed in the polymer network, the thermal barrier layer having a thermal conductivity of no more than 0.05 W·m$^{-1}$·K$^{-1}$.

20. The electrochemical system of claim 19, wherein the thermal barrier layer has a thermal stability of at least 1000° C.

* * * * *